United States Patent Office 3,093,415
Patented June 11, 1963

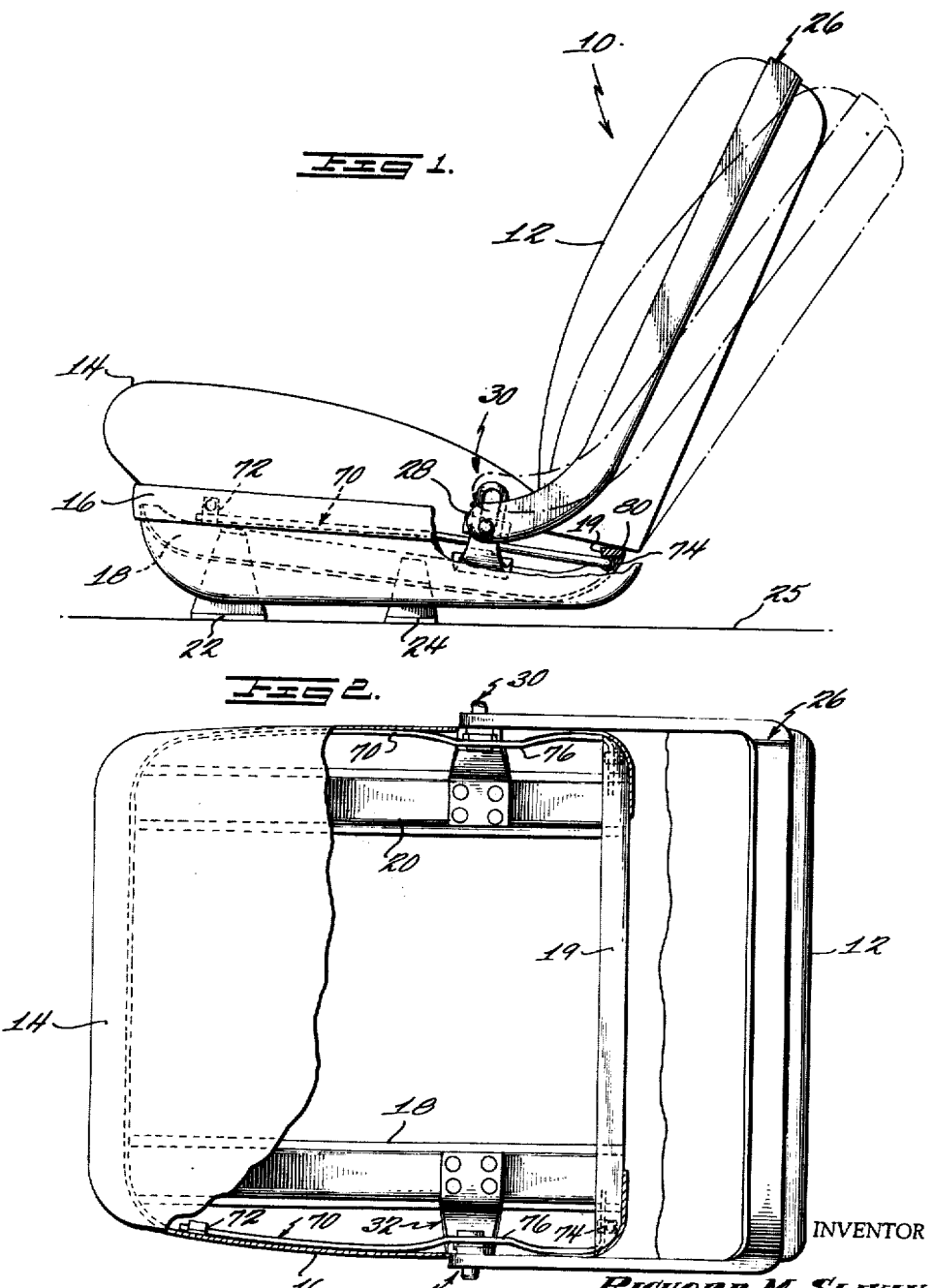

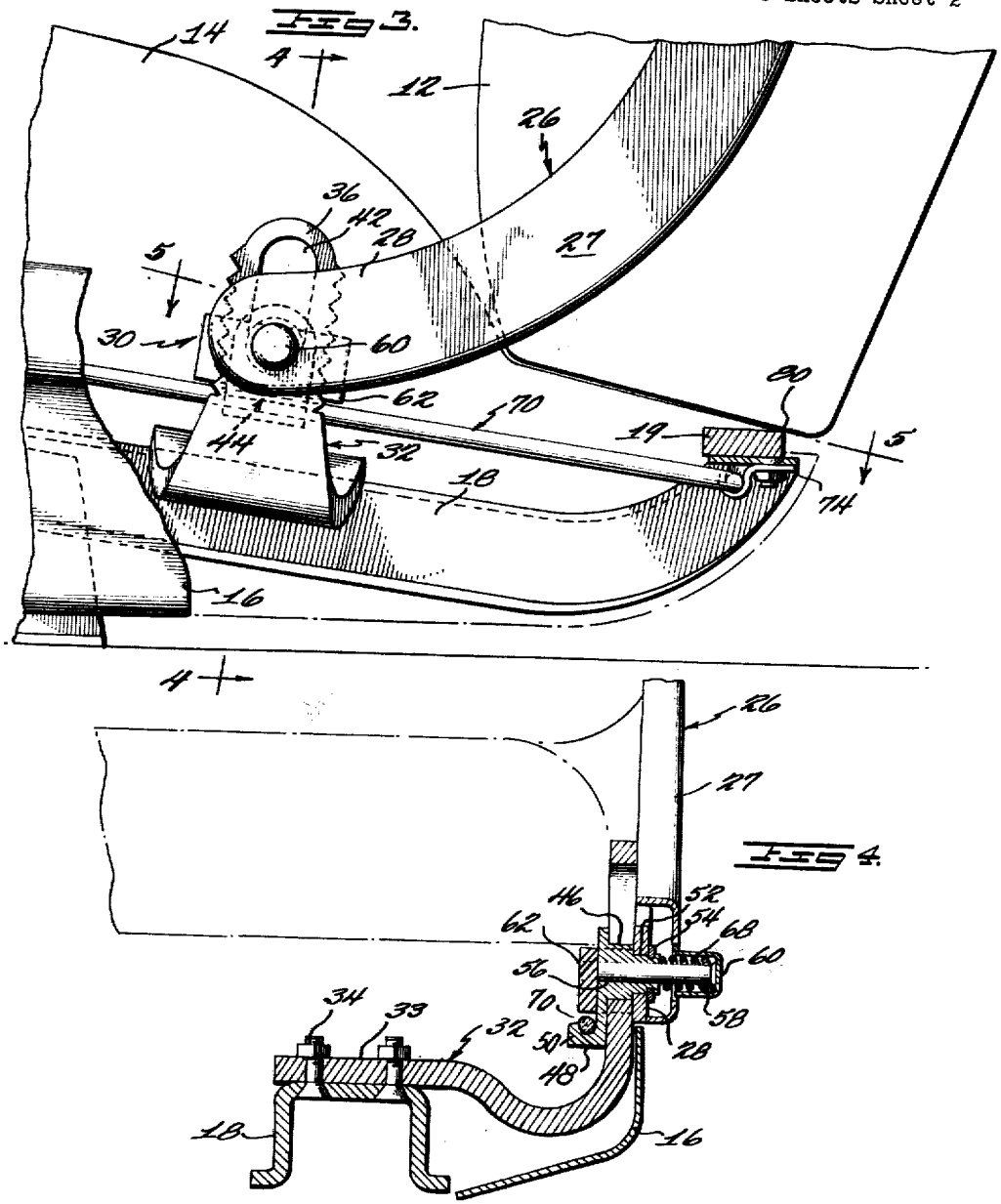

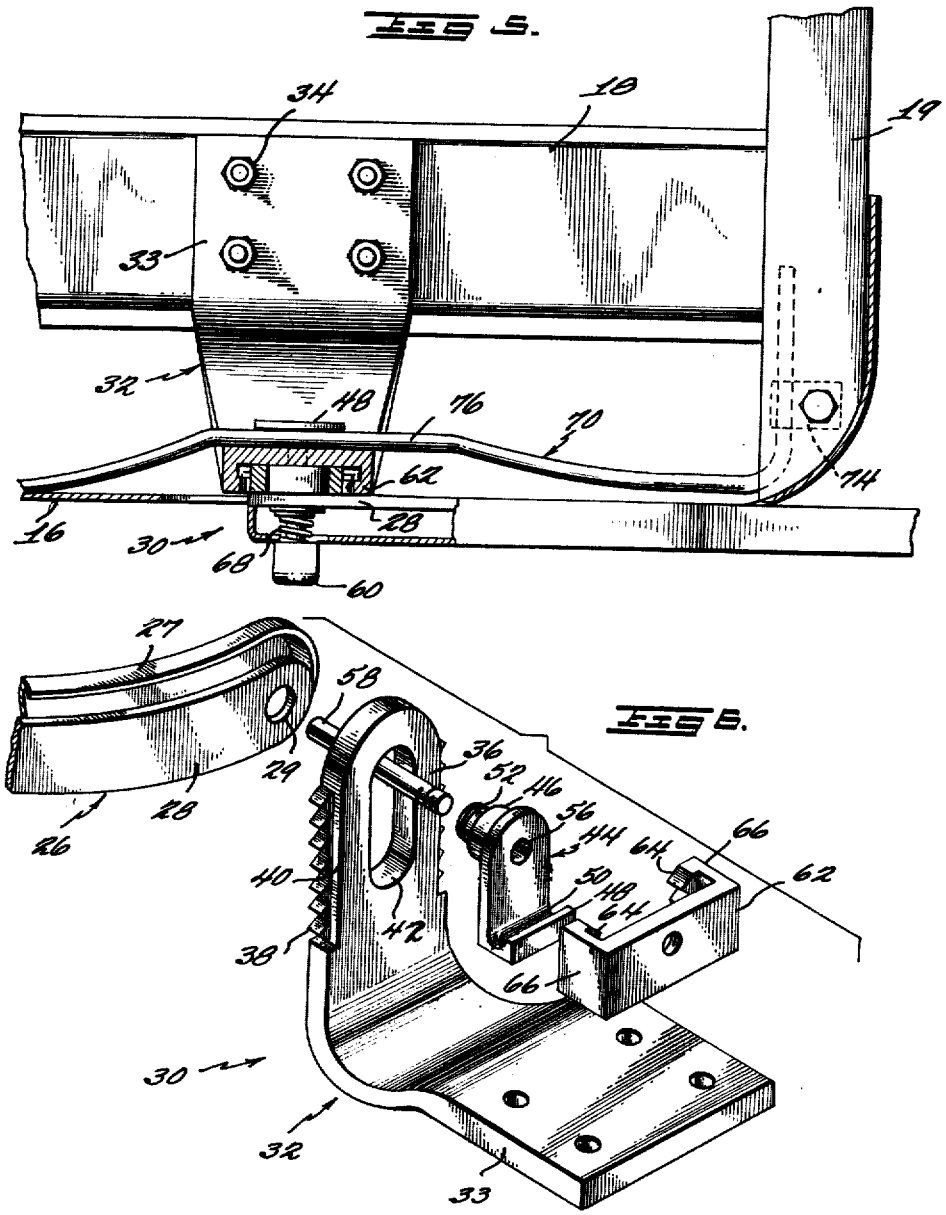

3,093,415
RECLINING SEAT BACK
Richard M. Slivik, Detroit, Mich., assignor to General Motors Corporation, Detroit, Mich., a corporation of Delaware
Filed Aug. 1, 1961, Ser. No. 128,537
9 Claims. (Cl. 297—373)

This invention relates to a vehicle seat and more particularly to a latch mechanism that permits the back portion of the seat to be adjustably reclined.

Many of the present day vehicles are designed exteriorly and interiorly with the "sport" type vehicle in mind. In this connection, automobile manufacturers have replaced the conventional single unit front-passenger vehicle seat with a pair of individual seats. The descriptive term in vogue at the present time for identifying these seats is "bucket seats." The advantages of the so-called bucket seats is that each of the front passengers may individually position their respective seats so as to provide adequate leg room and/or vision as best suited for the particular person. In most instances, the bucket seats are placed in vehicles having two doors with a conventional single unit type seat disposed in the rear-passenger compartment. This arrangement necessitates the back portion of the bucket seats to be pivotally movable in a forward direction so as to facilitate passenger access to the rear compartment.

The present invention is concerned with the "bucket" type vehicle seat referred to above and contemplates a latching mechanism that will permit the rear portion of the seat to be foldable in a forward position and, in addition, be rearwardly inclined so as to permit a passenger, such as the non-driver, to assume a more restful position. The latch mechanism is disposed at a pivot point of the seat back and combined with a hinge arm that is rigidly attached to the seat back. A base member is secured to the seat portion of the bucket seat, and has an upstanding rack portion with an elongated slot formed therein. A locking member is slidably movable within the slot and is connected through an intermediate member to the aforementioned hinge arm. A push-button type rod projects through the intermediate member and is connected with the lock member for releasing the latter from engagement with the rack portion of the base member. A spring is appropriately associated with the seating portion of the seat and the latch mechanism for automatically returning the back portion, when reclined, to a normal seating position. The latter movement occurs upon releasing the lock member of the latch mechanism.

An object of the present invention is to provide a seat having a back portion that may be adjustably reclined.

Another object of the present invention is to provide a seat having a latch mechanism that permits a seat back to be reclined at various angles to the horizontal and locked in position at the desired inclination.

Another object of the present invention is to provide a vehicle seat having a latch mechanism for adjustably locking a reclining seat back and permitting the latter to be automatically returned to a normal sitting position by unlocking the latch mechanism.

A further object of the present invention is to provide a vehicle seat having an adjustably reclining seat back that may also be forwardly inclined so as to facilitate access to the rear compartment of the vehicle.

A still further object of the present invention is to provide a vehicle seat having a latch mechanism for adjustably locking the seat back in a reclining position; the lock member of the latch mechanism being operated by the unidirectional movement of one finger of the operator.

Other objects and advantages of the present invention will be readily ascertainable from a perusal of the attached drawings and description in which—

FIGURE 1 is an elevation view of a single passenger vehicle seat incorporating the present invention;

FIGURE 2 is a plan view of the seat in FIGURE 1 with a portion cut away to illustrate the superstructure of the vehicle seat;

FIGURE 3 is an exploded view of the latch mechanism incorporated with the vehicle seat of FIGURE 1;

FIGURE 4 is a section view taken at lines 4—4 of FIGURE 3;

FIGURE 5 is a section view of the latch mechanism taken on lines 5—5 of FIGURE 3;

FIGURE 6 illustrates the individual disassembled components of the latch mechanism in perspective.

Referring to FIGURES 1 and 2, a vehicle seat generally indicated by the numeral 10 is shown comprising a seat back portion 12 and a seat portion 14. The seat portion 14 is mounted within a receiving well defined by a contoured member 16 that envelops the lower portion of the seat and serves as an attractive cover for the frame portion of the seat. The frame portion consists of a pair of spaced parallel beams 18 and 20 that are hat-shaped in cross section, and are suitably connected to upstanding seat supports 22 and 24. The beams are joined together at the rear end of the seat portion 14 by a transversely extending bar 19. As shown in FIGURE 1, the seat supports 22 and 24 are securely fixed to the vehicle floor 25, and connected with the beam member 18. It should be appreciated that a pair of similarly shaped seat supports are employed with the beam 20. The seat support and beam arrangement is such that fore and aft movement of the seat 10 is permitted.

The seat back 12 comprises a generally rectangular cushion portion that is embraced on three sides thereof by a U-shaped hinge member generally indicated by the numeral 26. As best viewed in FIGURES 4 and 6, the hinge member 26 includes an outer cover portion 27 and an inner support arm 28 having a pivot aperture 29. The hinge member 26 is rigid with the seat back 12 with the support arms 28 pivotally carried by a latch mechanism generally indicated by the numeral 30. The latch mechanism 30 permits the seat back 12 to be pivoted in a forward direction onto the seat cushion 14 and, in addition, to be inclined rearwardly in a plurality of positions, one of which is illustrated by the phantom lines in FIGURE 1. It should be noted that a latch mechanism 30 is utilized on each side of the seat 10, and is associated with the hinge member 26 at the pivot apertures 29. Although a pair of the latch mechanisms are employed with the seat 10, reference hereinafter will be made to one only in that the operation and components of each is identical.

Referring now to FIGURES 3 through 6, the latch mechanism 30 is shown comprising a base member 32 that has a laterally inwardly extending portion 33 secured to one of the beams, such as 18, by a plurality of screws 34. The base member is generally L shaped and includes an upwardly extending narrow portion 36 having a plurality of teeth 38 formed on opposite sides thereof. As best viewed in FIGURE 6, the teeth extend only over a portion of the width of the base member 32 so as to provide a clear portion 40 of a length equivalent to the teeth length, for purposes which will hereinafter be explained. An elongated slot 42 is formed in the upstanding portion 36 with the longitudinal axis thereof extending in a substantially vertical direction and in line with the longitudinal axis of the upstanding portion. A mounting member, generally indicated by the numeral 44, is provided with a bearing portion 46 that extends therefrom and into slidable relationship with the slot 42 in the base member. The mounting member 44 includes a laterally projecting flange 48 that has an elongated groove 50 formed therein. Adjacent the bearing portion 46, a reduced diameter portion 52 is formed and serves to pivotally carry the curved support arm 28 of the hinge member 26. The arm 28 is securely held from lateral movement by a lock washer 54, as best seen in FIGURE 4. In addition, an aperture 56 is formed in the member 44 for slidably accommodating a push button rod 58. The push rod 58 extends through the aperture 56 in the mounting member 44 and has a cup-shaped finger member 60 secured at one end. The other end of the rod 58 is fixed to a locking member 62. The locking member is C-shaped and includes a plurality of teeth 64 formed on the inturned portions 66. The teeth 64 are similar to those formed on the portion 36 and are adapted to coact therewith for locking the latch mechanism 30.

Spaced from the lock washer 54 and abutting the face of the spring 68, serves to maintain the push rod and concentrically surrounds the rod 58 and has one end received within the cup-shaped member 60. The member 60, being secured to the push rod 58 and under the influence of the spring 68, serves to maintain the push rod and connected locking member 62 in engagement with the teeth 38 formed on the base member.

Combined with the above described latch mechanism 30 is a spring member 70 that consists of an elongated spring rod that is connected by brackets 72 and 74, respectively, to the bar 19 and to the contoured member 16. The spring member 70 is disposed in a longitudinal direction with respect to the seat with an intermediate portion 76 bent inwardly so as to be received within the groove 50 formed in the mounting member 44. This spring cooperates with the latching mechanism for returning the seat back 12 from a reclined to a normal seating position.

The operation of the present invention is as follows:

Assuming the seat back 12 is in a position as shown by the full lines in FIGURE 1, and it is desired to have the seat back reclined to the position illustrated by the phantom lines, the procedure followed by the occupant of the seat is as follows: By utilizing one finger of each hand, the occupant depresses the push button 60 of each latch mechanism in an inward direction. This action serves to move the lock member 62 out of engagement with the teeth 38 formed on the base member and simultaneously in alignment with the tooth-free portion 40. At this time the arm 28 together with the mounting member 44 is freely movable in the slot 42 in a vertical upward direction for inclining the seat back 12. This latter movement is realized by a rearward pressure being applied by the occupant onto the seat back 12. The rearward pressure applied to the seat back causes the mounting member 44 to travel upwardly in the slot 42 and the lower portion of the seat back 12 to move about the edge 80 of the bar 19. The edge 80 acts as a fulcrum for the seat back and together with the latch mechanism supports the seat back in the reclined position. Upon obtaining the desired position, the occupant releases the push button 60 of each latch mechanism 30, whereupon the coil spring 68 automatically returns the locking member 62 into engagement with the teeth 38 formed on the base member 32, and thereby locks the seat back in position.

When the seat back 12 is moved to the phantom line position of FIGURE 1, the mounting member 44, due to its upward movement in the slot 42 and connection with the spring member 70, causes the spring portion 76 to be displaced in an upward direction. Consequently, the spring 70 exerts a continuous downward force on the mounting member 44 that is capable of returning the latter to a lower position in the slot 42 but for the engagement of the lock member 62 with the rack portion of the base member. To release the lock member 62 and return the seat back 12 to a normal sitting position, once again, the push buttons 60 are depressed inwardly. At the same time, the occupant removes any body pressure from the seat back, thereby permitting the spring 70 to draw the mounting member 44 together with hinge member 26 to the lower portion of the slot 42 resulting in the seat back reassuming the full line position shown in FIGURE 1. It should be appreciated that by providing a plurality of teeth 38 on the upstanding portion of the base member 32, a number of locking positions are obtainable between the fully inclined and the normal sitting position of the seat back 12. This arrangement, of course, permits the occupant to select a seat back inclination that is most comfortable for him.

It should be understood that although I have described my invention in some detail, modifications and variations may be made in the form and arrangement of parts without departing from the spirit of my invention. Therefore, I do not wish to be limited to the exact structure herein shown and described, but claim as my invention all forms thereof coming within the scope of the appended claims.

What is claimed is:

1. In a chair having a back portion pivoted to a seat portion and movable between a normal sitting position and an inclined position, a hinge member having an arm attached to said back portion and a pivot portion formed therewith, a base member secured to said seat portion, a slot formed in said base member for pivotally and slidably carrying said pivot portion of said hinge member, and a latching means operatively associated with said base member and said pivot portion for locking said back portion between said positions.

2. In a chair having a back portion pivoted to a seat portion and adjustably movable between a normal sitting position and an inclined position, a latching device associated with said seat portion, said back portion including a hinge member having one end thereof secured to the back portion and the other end receivable by said latching device, said latching device comprising first means for pivotally and slidably carrying said other end of said hinge member, second means for locking said back portion between said normal sitting position and inclined position, and third means for automatically returning said back portion from an inclined position to a normal position upon release of said second means.

3. In a chair having a back portion pivoted to a seat portion and adjustably movable between a normal sitting position and an inclined position, a latching device associated with said seat portion, said back portion including a hinge member having one end thereof secured to the back portion and the other end receivable by said latching device, said latching device comprising a base member attached to said seat portion, an elongated slot formed in said base member and adapted to pivotally and slidably carry said other end of said hinge member, means for locking said other end of said hinge member in said slot, and spring means connected with said other end of said hinge arm for automatically returning said back portion from an inclined position to a normal position upon release of said means for locking.

4. In a chair having a back portion pivoted to a seat portion and adjustably movable between a normal sitting position and an inclined position, a latching device associated with said seat portion, said back portion including a hinge member having one end thereof secured to the back portion and the other end receivable by said latching device, said latching device comprising a base member attached to said seat portion, an elongated slot formed in said base member, a locking member slidably mounted in said slot, means for pivotally connected said other end of said hinge with said locking member, means formed on said base member for engagement by said locking member for locking said back portion between said positions.

5. In a chair having a back portion pivoted to a seat portion and adjustably movable between a normal sitting position and an inclined position, a latching device associated with said seat portion, said back portion including a hinge member having one end thereof secured to the back portion and the other end receivable by said latching device, said latching device comprising a base member attached to said seat portion, an elongated slot formed in said base member, a locking member slidably mounted in said slot, means for pivotally connecting said other end of said hinge with said locking member, means formed on said base member for engagement by said locking member for locking said back portion between said positions, and spring means engageable with said locking member for automatically returning said back portion from an inclined position to a normal position upon disengagement of said locking member with said means formed on said base member.

6. In a chair having a back portion pivoted to a seat portion and adjustably movable between a normal sitting position and an inclined position, a latching device associated with said seat portion, said back portion including a hinge member having one end thereof secured to the back portion and the other end receivable by said latching device, said latching device comprising a base member attached to said seat portion, an elongated slot formed in said base member, means slidably mounted in said slot and having a portion for pivotally connecting said other end of said hinge thereto, a push rod associated with said means, a locking member fixed to one end of said push rod and adapted to coact with said base member for locking said back portion in a desired inclined position, and means for returning said back portion from an inclined position to a normal sitting position.

7. The apparatus of claim 6 wherein a spring is associated with said means for returning said back portion from an inclined position to a normal sitting position.

8. The apparatus of claim 7 wherein said seat portion includes means for mounting said spring.

9. The apparatus of claim 6 wherein said push rod includes means for automatically returning the locking member from an unlocked to a locked position.

References Cited in the file of this patent

UNITED STATES PATENTS

| | | |
|---|---|---|
| 1,860,096 | Headley | May 24, 1932 |
| 1,927,491 | Gabb | Sept. 19, 1933 |
| 1,945,781 | Kersten | Feb. 6, 1934 |
| 2,603,275 | Kuebler | July 15, 1952 |

UNITED STATES PATENT OFFICE
CERTIFICATE OF CORRECTION

Patent No. 3,093,415                          June 11, 1963

Richard M. Slivik

It is hereby certified that error appears in the above numbered patent requiring correction and that the said Letters Patent should read as corrected below.

Column 3, line 17, for "spring 68, serves to maintain the push rod and" read -- bearing surface, is a coil spring 68 that --.

Signed and sealed this 24th day of December 1963.

(SEAL)
Attest:
ERNEST W. SWIDER

EDWIN L. REYNOLDS

Attesting Officer

Acting Commissioner of Patents